Figure 1:
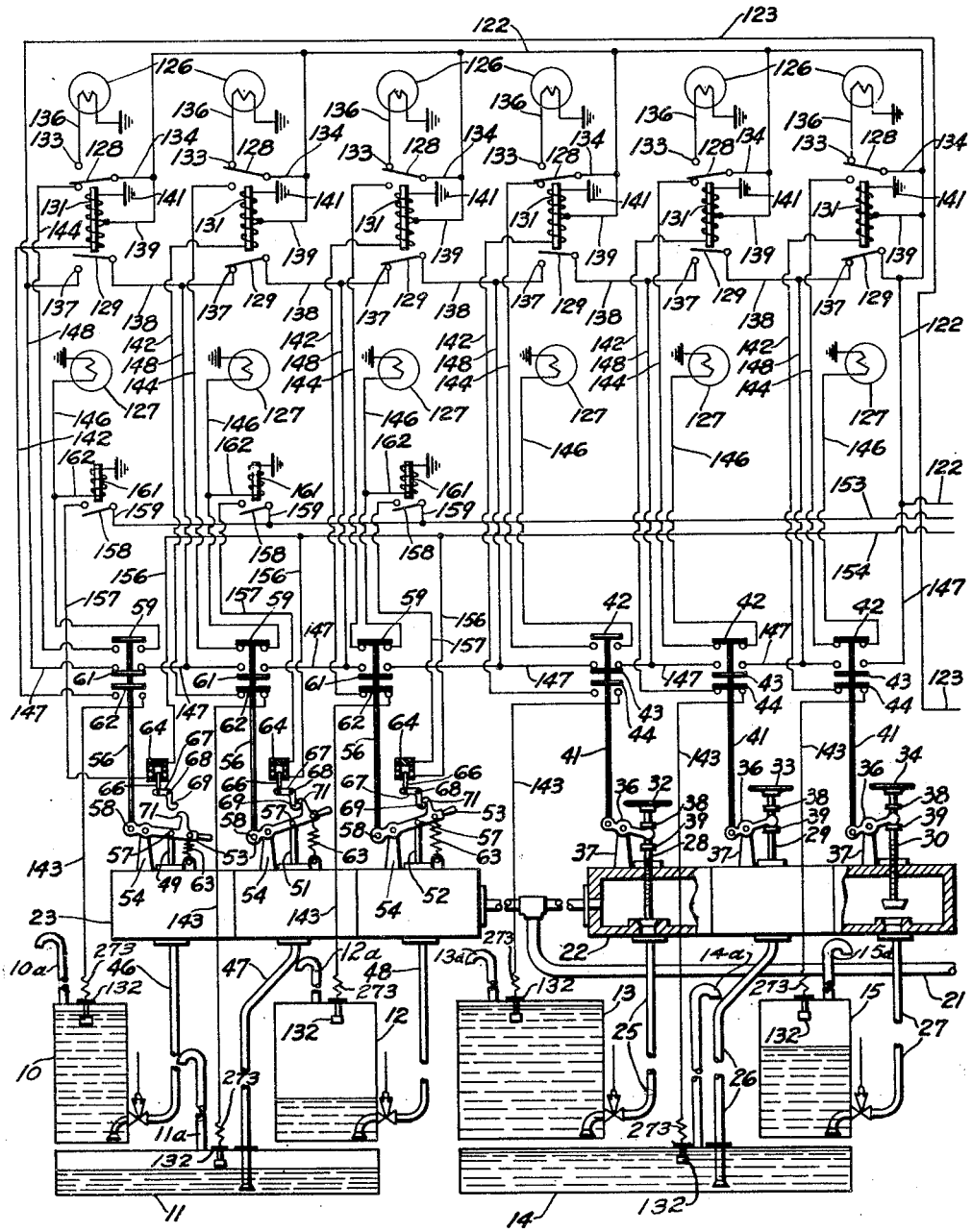

Jan. 25, 1944.     C. R. McCAULEY ET AL     2,340,070
CONTROL DEVICE
Filed Sept. 19, 1942     3 Sheets-Sheet 1

CLAUDIUS R. McCAULEY
AND
OTIS W. PAGE
INVENTORS

BY
ATTORNEY

Jan. 25, 1944.        C. R. McCAULEY ET AL        2,340,070
CONTROL DEVICE
Filed Sept. 19, 1942        3 Sheets-Sheet 3

CLAUDIUS R. McCAULEY
AND
OTIS W. PAGE
INVENTORS

BY *J. B. Mothershead*

ATTORNEY

Patented Jan. 25, 1944

2,340,070

UNITED STATES PATENT OFFICE 2,340,070

CONTROL DEVICE

Claudius R. McCauley and Otis W. Page,
New Orleans, La.

Application September 19, 1942, Serial No. 459,052

25 Claims. (Cl. 137—68)

(Granted under the act of March 3, 1883, as
amended April 30, 1928; 370 O. G. 757)

This invention relates to filling a plurality of tanks concurrently, and it pertains particularly to a system for filling tanks, such as the fuel tanks of a ship, for example, which may have different shapes and capacities and which may also be disposed at different elevations and in various locations so that all of the tanks do not fill to the desired levels at the same time.

The filling of a ship's tanks with fuel oil requires a special piping system which, for satisfactory operation, should be capable of fueling the ship in the shortest possible time consistent with the installation of pipes of a reasonable size, as well as with the capacity and the pressure head of the barge or shore pumps available. It is likewise highly desirable to prevent the overflow of oil to the sea or decks, as this would create a fire hazard, contaminate harbor waters and subject the ship to a fine. It is also very important to prevent a pressure head in excess of the test head coming on the tanks, as this would subject them to distortion and to opening up of their seams.

These desirable objectives may be attained in accordance with the present invention, which provides for filling a plurality of tanks, such as the fuel tanks of a ship, under the maximum available or permissible pressure head without regard for the relative sizes, shapes or locations thereof, which may and usually do cause the tanks to become filled at different times. Systems heretofore provided for this purpose have supplied fuel, for example, to the tanks at a rate and pressure which would not damage a tank in the event that it was still subjected to pressure from the filling main after it became full. In some instances, comparatively long periods of time have been required for filling a ship's tanks largely because of the size of the conduits or piping used, while in others it has been considered that the cost of piping of a size adequate for filling the tanks in a relatively short time would be so excessive as to make the system impracticable.

The present invention provides for supplying fuel oil to a ship's tanks, for example, under two degrees of pressure, one of which may be relatively high, as that available from the barge or shore pumps. This relatively high pressure may be maintained, so as to cause the tanks to fill rapidly, until one of the tanks becomes filled to the desired level, at which time pressure on the fuel oil delivered to all of the tanks may be reduced to the lower degree thereof until the filled tank has been isolated from the system. This lower degree of pressure may be such as to avoid damage to any tank after it has become filled and before it has been isolated from the pressure head from the filling main.

The invention provides for establishing the lower degree of pressure by relieving the pressure from the filling main, preferably through a suitable standpipe which may discharge into any of a plurality of overflow or settling tanks. Preferably, means are also provided for protecting these settling tanks by diverting the discharge from the standpipe from one settling tank to another, preferably as one settling tank fills to the desired level.

The invention also provides equipment for these purposes which may be mostly automatic, or partly automatic and partly manual in operation. This equipment may be and preferably is adapted to inform the operators or attendants of the condition of the system so that they may know which degree of pressure head is on the tanks, which tanks are unfilled and are filling, which are filled and whether the latter have been isolated from the system, etc. The invention also provides improvements in the construction and relative arrangement of parts for and of a system of the class described.

Further features of the invention reside in means for indicating when a tank is filled, which means, preferably, is in the form of a pressure responsive device adapted to be disposed within a tank and having electrical contacts separable in response to pressure in the tank for controlling an electric circuit extending outside the tank where it may actuate indicating and other apparatus, such as that for closing the admission valve to that tank, and/or for reducing the pressure head on the tanks to a lower or safe degree thereof.

Figure 2:
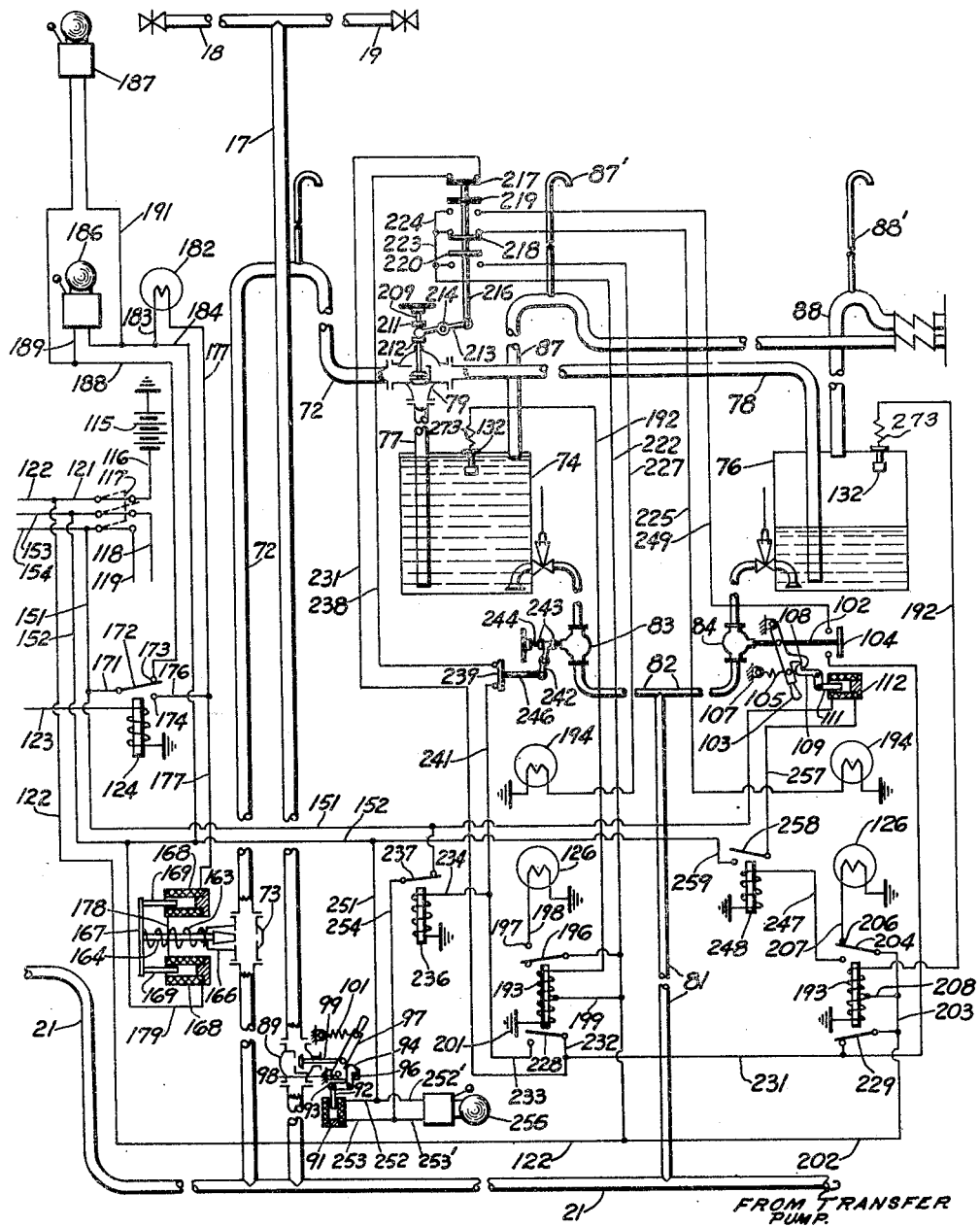
Figure 4:
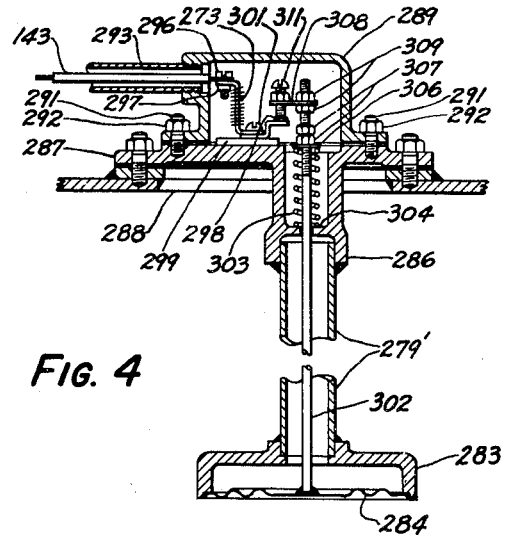
Figure 3:
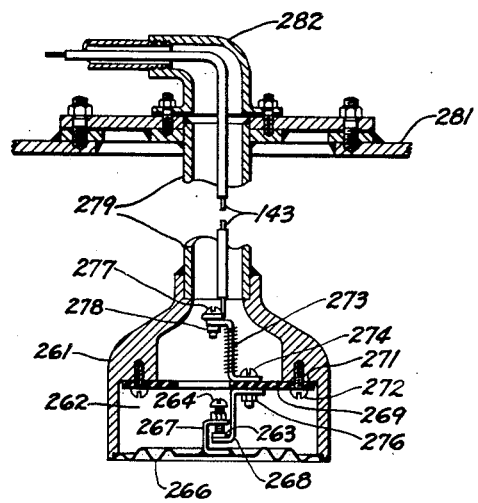

The features of the invention are illustrated in the accompanying drawings, wherein:

Figs. 1 and 2 constitute one view partly in elevation and partly diagrammatic, with parts omitted and broken away, showing a system for filling the fuel tanks of a ship; Fig. 1 shows a number of fuel tanks and apparatus associated therewith, including a large portion of the electrical circuits and devices cooperating therewith; Fig. 2 shows the rest of the system including the main feed line, the overflow connections, settling tanks and cooperating electrical and mechanical apparatus as well as electrical circuits and devices for the equipment shown in Fig. 1;

Fig. 3 is a vertical sectional view, with parts omitted and broken away for purposes of illustration, showing a pressure responsive device disposed in a tank and having separable electrical contacts located within the tank; and Fig. 4 is a view similar to Fig. 3, but illustrating another form of pressure responsive device having separable electrical contacts located outside the tank.

The embodiment selected for illustration comprises a system for filling a ship's fuel tanks 10, 11, 12, 13, 14 and 15. As these tanks are of different shapes and capacities and are disposed in various locations, tanks 10, 12, 13 and 15 being deep tanks and tanks 11 and 14 being double bottom tanks, they do not become full at the same time. For supplying fuel oil to these tanks there is shown a feed main 17 having suitable connections at its upper end as indicated at 18 and 19 for receiving oil under pressure from some source, as from available barge or shore pumps. This feed main may be connected at its lower end to a conduit 21 extending about the ship in proximity to the various tanks and having interposed therein suitable manifolds 22 and 23, there being, preferably, one manifold associated with each group of proximate tanks.

The conduit 21 may also be connected to an oil transfer pump (not shown), which may receive its supply through a separate system of pipes and manifolds from the tanks 10 to 15 inclusive. Fuel oil thus supplied to conduit 21 from the transfer pump may be conveyed to the settling tanks 74 or 76 through conduits 81 and 82. From the settling tanks, the fuel oil may be conveyed to a point of use in the ship.

For purposes of illustration manifold 22 is shown with hand operated valves embodying a semiautomatic filling system, and manifold 23 is shown with hand-opened, self-closing solenoid latch trip valves, embodying automatic operation of this filling system.

From manifold 22 oil may be delivered through valved connections comprising tail pipes 25, 26 and 27 leading respectively to tanks 13, 14 and 15. The flow from the manifold may be controlled through manually operable valves within the manifold, only the threaded stems 28, 29 and 30 and their associated hand wheels 32, 33 and 34 of these valves are shown, as the internal manifold valve structure may be of any suitable form. The air displaced by the inflowing oil from the manifold 22 is allowed to escape from the tanks 13, 14 and 15, through vent pipes 13a, 14a and 15a to the atmosphere. The vent pipes 13a, 14a and 15a extend from the tank top, upwardly through the weather deck and open into the atmosphere. Each of the valve stems 28, 29 and 30 may have associated therewith a rocker 36 mounted to pivot intermediate its ends, as on a bracket 37 which may be carried by the manifold. One end of this rocker may be forked, bifurcated or otherwise adapted to ride in the channel formed by spaced collars 38 and 39 fixed to the valve stem. The other end of this rocker may be pivotally connected to a vertically movable rod 41 having spaced switch pieces 42, 43 and 44 mounted thereon.

Flow from manifold 23 may be controlled through valved connections comprising tail pieces 46, 47 and 48 leading respectively to tanks 10, 11 and 12. Air displaced by oil flowing into tanks 10, 11 and 12 is allowed to escape to the atmosphere through vent pipes 10a, 11a and 12a. These vent pipes also extend from the tank top upwardly through the weather deck and open to the atmosphere. Self-closing, solenoid latch trip valves having stems 49, 51 and 52 may be provided for controlling the flow from the manifold through these tail pipes. Associated with each of valve stems 49, 51 and 52 there is a lever 53 mounted to pivot intermediate its ends, as on a bracket 54 which may be carried by manifold 23. On opposite sides of its pivot point this lever may be pivotally connected, respectively, with the valve stem and with a vertically movable rod 56, as indicated at 57 and 58. Preferably, each of the rods 56 has spaced switch pieces 59, 61 and 62 fixedly mounted therealong. Suitable means such as a contractile spring 63 may be connected between each lever 53 and some fixed point, as on manifold 23, for normally urging the lever in a clockwise direction as shown so as to move the valve stems downwardly to close the valves controlling the flow through the tail pipes. For holding these valves open there may be provided solenoids 64 each associated with one of the valves and each having its core piece 66 pivotally connected to a latch in the form of a bell crank 67 mounted to pivot as at 68 and having formed on its lower arm a detent 69 which is engageable with a cooperating abutment or detent 71 fixedly mounted on each lever 53.

In order that liquid, such as fuel oil, may be supplied, as from barge or shore pumps, through feed main 17 and conduit 21 to the tanks under a relatively high degree of pressure for filling the tanks in the shortest possible time, and also to provide for relieving this pressure so as not to damage any tank when it becomes full, there may be provided a standpipe 72 connecting at its lower end with conduit 21. This standpipe may be of suitable height to assure that any filled tank will not be subjected to excessive pressure, as a pressure above its test head, while flow is permitted through this standpipe. For controlling the flow through this standpipe and for closing the latter to maintain the relatively high degree of pressure on the system, suitable valve means, preferably a self-opening solenoid closing valve 73 may be interposed in this standpipe.

The overflow from the standpipe may be received in overflow or settling tanks 74 and 76 through connections 77 and 78, respectively. These settling tanks 74 and 76 are normally at a low liquid level at the beginning of the filling operation of the tanks 10 to 15 inclusive for the purpose of providing sufficient capacity to receive the overflow oil. For selectively determining which of tanks 74 and 76 is to receive the overflow, a suitable directing means preferably in the form of a three-way valve 79 may be interposed between the discharge end of the standpipe and connections 77 and 78 and adapted in its lower position, as shown, to divert fluid from the standpipe through connection 78 to tank 76. When valve 79 is in its upper position, connection 78 is closed thereby and fluid from the standpipe is directed through connection 77 into tank 74. There may also be a connection 81 from conduit 21 to branch connection 82 and thence through valve 83 to tank 74, and through valve 84 to tank 76 for the purpose of filling the settling tanks 74 and 76 from conduit 21, either after the main tanks 10 to 15 inclusive are filled or from tanks 10 to 15 through the oil transfer pump (not shown) and conduit 21. During the period required to fill the tanks 10 to 15 inclusive, valves 83 and 84 would normally be closed. If, however, the valve 84 is inadvertently left open, fuel oil would flow to tank 76 through conduits 17, 21, 81 and 82 while the tanks 10 to 15 inclusive, are being filled. In such an event, as soon as the tank 76 becomes full, the valve 84 will automatically be tripped shut, thus preventing oil from flowing overboard through the overflow connection 88.

For the purpose of illustration, the valve 83 is shown as a manually operable valve while the valve 84 is shown as a self-closing solenoid operated trip valve. These valves may be both manually operable or both automatic. Overflow connections 87 and 88 may be equipped with suitable vents 87' and 88' and extend overboard from settling tanks 74 and 76, respectively. To avoid subjecting settling tanks 74 and 76 to excessive pressures and/or to avoid running oil overboard when one or both of these tanks is filled, a suitable valve, preferably a self-closing, solenoid actuated latch trip valve 89 may be interposed in feed main 17.

This valve 89 may have associated therewith a solenoid 91 arranged to have its core piece 92 pivotally connected to one arm of a bell crank 93, while the other arm of the bell crank may be in the form of a latch 94 engageable with abutment 96 carried by lever 97 which is pivoted at 98 and has valve stem 99 of valve 89 suitably connected thereto for movement thereby between the closed and open positions of the valve. A contractile spring 101 may be connected between lever 97 and some fixed point, as the body of valve 89, for urging lever 97 in a direction to close valve 89.

Solenoid, latch trip valve 84 in branch connection 82 may be equipped with a stem 102 suitably connected to lever 103 for movement by the latter between open and closed positions. A switch piece 104 may be carried by the stem for completing and interrupting an electrical circuit when this valve is in its closed and open positions, respectively. A contractile spring 105 may be connected between lever 103 and any suitable fixed point, as bracket 107, for urging this lever in a direction to close this valve. This lever may have a detent 108 mounted thereon for cooperative engagement with a latch member 109 in the form of a bell crank connected to core piece 111 of solenoid 112.

Electrical energy for controlling the operation of this system may be supplied from a suitable battery 115 through conductor 116 to the upper terminal of a main switch 117, and also from another suitable source, as from a generator (not shown) through conductors 118 and 119 to the middle and lower terminals, respectively, of switch 117. The battery supplies electrical energy for operating various relays, and visual signalling means, such as lamps under the control of the pressure responsive devices 132 associated with the respective tanks. The circuit from the other power source, as from a generator (not shown), supplies electrical energy for operating various solenoids and visual and audible signalling means.

The battery circuit extends through the upper blade of switch 117 to conductor 121, thence to conductor 122 from which it passes in various ways to ground or to conductor 123 and relay 124 to ground. Included in the battery circuit and associated with each of tanks 10 through 15 are groups of devices which may be and preferably are arranged in the circuits in identically the same manner and preferably corresponding devices of each group are identical. The devices of each of these groups comprise signal lamp bulbs 126, 127, preferably of contrasting colors, switch blades 128 and 129, differential relays 131 and pressure responsive devices 132, the latter being disposed in the respective tanks. The windings of the differential relays 131 are connected to the battery by conductors 139 at a tap intermediate the ends of the windings. The circuit from the battery is thus divided into two paths to ground. One path extends through the upper portion of the windings to ground at 141. The other path extends through the lower portion of the winding, through conductor 142, switch 62 or 44, conductor 143, resistor 273 and pressure operated switch 132 to ground at the tank. The resistor 273 is so designed as to offer resistance of such value as to maintain the differential relay in a magnetically balanced condition. Should the switch 132 be opened, the differential relay associated therewith, will become magnetically unbalanced to throw switches 128, 129. Likewise, should either the conductors become open or broken, the same operation would take place. Similarly should conductors 142 or 143 become shorted, the differential relay becomes magnetically unbalanced and it will perform the same operation. It will thus be seen that the resistor 273 performs a very important function in relation to the differential relay 131 in providing for the detection of a grounded condition in the control circuit and in the case of the automatic system, it also causes the tanks 10 to 12 inclusive to be isolated, from the pressure and thus protects the tanks against damage.

Preferably, switch blades 128 are normally biased against their associated terminals 133 for completing a circuit from conductor 122 through lead 134, switch blade 128, conductor 136 and lamp 126 to ground while the differential relay 131 is magnetically balanced. Likewise switch blades 129 preferably are normally biased against their respective associated terminals 137 for completing a circuit from conductor 122 through long conductor 138, in which switches 129 are interposed, to conductor 123 and relay 124 to ground. Circuits also extend from conductor 122, lead 139 to the winding of differential relay 131 and to ground at 141 and from the winding of differential relay 131 through conductor 142, across switch pieces 44 (for tanks 13—15), or across switch pieces 62 (for tanks 10—12), through conductor 143 and through the resistor 273 to pressure responsive device 132 and to ground thereon when the respective tanks are not filled to the desired levels. Another circuit extends from each switch blade 128, when in its lower position, through conductor 144, across switch pieces 42 (for tanks 13—15) or across switch pieces 59 (for tanks 10—12) and through conductor 146 and lamp bulb 127 to ground. Preferably, each of the middle switch pieces 43 (for tanks 13—15) or 61 (for tanks 10—12) is adapted to interrupt or to complete a by-pass circuit around each of switches 129. These by-pass circuits are formed by a long conductor 147, in which switch pieces 43 and 61 are interposed, and conductors 148 between conductor 138 and conductor 147, the latter of which extends from conductor 122 to conductor 123.

For operating the solenoids 84 of the trip valves controlling tanks 10—12, electrical energy may be supplied from conductors 118 and 119, main switch 117, and conductors 153 and 154. Each of solenoids 84 is connected in a circuit comprising a connection 156 from conductor 154 to the solenoid, a connection 157 between the solenoid and a normally open switch 158, and a connection 159 from the normally open switch to conductor 153. Suitable relays 161 may be provided for closing switches 158. The circuit for each of relays 161 comprises a connection 162 from conductor 146 to the winding of the relay and to ground when the circuit 144, 59 and 146 becomes energized to cause the light 127 to glow, the relay 161 is simultaneously energized to trip the associated valves 49, 51 or 52.

For operating valve 73 in standpipe 72, a suitable expansible spring 163 may be disposed about the valve stem 164 between the valve casing 166 and a cross member 167 secured to the valve stem, so that the spring urges the valve outwardly to its open position. One or more solenoids 168 may have their core pieces 169 connected to cross member 167, so that when these solenoids are energized the valve stem will be drawn inwardly against the force of the spring to close valve 73.

The circuits from main switch 117 for solenoids 168 comprise conductor 151 and connection 171 to switch 172 which is normally biased against its upper contact 173, but when relay 124 is energized this switch is drawn against its lower contact 174 to complete a circuit through conductors 176 and 177 to upper solenoid 168, thence through the winding of this solenoid, conductor 178, the winding of lower solenoid 168, conductor 179 to conductor 152 and back to main switch 117.

Visual signalling means for indicating when valve 73 is closed may comprise a suitable lamp bulb 182, preferably of a readily distinguishable color, as red. This lamp bulb may be connected in parallel with solenoids 168 by means of conductors 177, 183 and 184 back to conductor 152.

Audible signalling means for indicating when one of tanks 10—15 is full and valve 73 is open comprise bells 186 and 187, one of which, as bell 186, may be located in the engine room to warn an operator, while the other bell, as 187 may be located at some suitable point, as on deck, to warn the barge operator, for example. The circuit for bell 186 comprises conductor 151 from main switch 117, conductor 171 through switch 172 to its upper contact 173 and through conductors 188 and 189 to bell 186, thence through conductors 184 and 152 back to main switch 117. The circuit for bell 187 is the same as that just described to conductor 188, bell 187, conductor 191 to conductor 184 and thence back to main switch 117 as described for bell 186.

In order that overflow or settling tanks 74 and 76 may be protected from excessive pressures, each of these tanks may have disposed therein a suitable means, preferably a pressure responsive device 132 which responds to pressure head as the tank becomes full to interrupt an electrical circuit through a conductor 192 leading from the pressure responsive device through resistor 273 to the winding of a differential relay 193, one of which is associated with each pressure responsive device. Each of these tanks may also have associated therewith visual signalling means comprising a lamp bulb 126, preferably green in color, for indicating when the tank is filling but not full, and also a lamp bulb 194, preferably white in color for indicating to which of these tanks liquid is being directed by three-way valve 79.

The battery circuit for these lamp bulbs, pressure responsive devices and relays, comprises connection 121 from main switch 117 to conductor 122 and switch 196, which is normally biased against contact 197 when the differential relay 193 is magnetically balanced, thence through conductor 198 and lamp bulb 126 to ground. A circuit also extends from conductor 122 through connection 199 to the winding of the differential relay associated with tank 74 and to ground at 201. Another circuit extends from conductor 122 through conductors 202 and 203, switch 204, which is normally biased against its upper contact 206 when the differential relay 193 is magnetically balanced, thence through conductor 207 and lamp bulb 126 associated with tank 76 and to ground. Another circuit also extends from conductor 203 through connection 208 to the winding of the differential relay associated with tank 76 and to ground.

The position of valve 79 may be adapted to control the illumination of lamps 194 so as to indicate to which of the settling tanks liquid is being directed by this valve. For this purpose valve stem 209 of valve 79 may have fixed thereon spaced collars 211, 212, between which the end portion of a rocker 213 may be adapted to ride. This rocker may be mounted to pivot intermediate its ends, as indicated at 214, and the end portion thereof which rides between collars 211 and 212 may be bifurcated or forked to embrace the valve stem, if desired. The other end of this rocker may be pivotally connected to a vertically movable rod 216 on which suitably spaced switch pieces 217, 218, 219 and 220 may be fixedly mounted. With valve 79 in the position shown, a circuit from the battery is completed from conductor 122 through conductor 222, jumper connection 223, switch piece 218 and conductor 225 to lamp 194 associated with tank 76 and to ground, thereby causing this lamp to be illuminated to indicate that valve 79 is set to direct liquid to tank 76. It will also be seen that with valve 79 set in its upper position for directing fluid to tank 74, a circuit from the battery is completed from conductor 222 across switch piece 220 and through conductor 227 to lamp 194 associated with tank 74 and to ground.

When tank 74 fills to the desired level, the pressure responsive device 132, disposed therein, interrupts the circuit through conductor 192 and unbalances the relay 193 associated with tank 74, thereby causing this relay to open switches 196 and 228. Opening switch 196 causes lamp 126 to go out, while opening switch 228 interrupts a circuit from the battery through conductors 122, 202, switch 229, conductors 231, 232, switch 228 and conductors 233 and 234, through the winding of holding relay 236 and allowing switch 237 to close and thereby causing valve 89 to close.

In order to open valve 89, relay 236 must be energized by completing a circuit from conductor 231 across switch piece 217, through conductor 238, switch 239 and conductor 241, to conductor 234 and relay 236. This circuit can not be completed unless valve 79 is in the position shown, in which it closes connection 77 to tank 74, and switch 239 is closed. This switch 239 may be interconnected with valve 83 so that both the switch and the valve are either closed or open. During the filling of tanks 10 to 15 inclusive valve 83 would normally be closed. For this purpose a rocker 242 mounted to pivot intermediate its ends may have one end thereof disposed between spaced collars 243 fixed on valve stem 244 for movement with the latter, while the other end of the rocker may be pivotally connected to a rod 246 affixed to switch 239.

When tank 76 fills to the desired level, pressure responsive device 132 disposed therein opens the circuit through conductor 192 and unbalances relay 193, thereby opening switch 229 and moving switch 204 from its upper to its lower position so as to open the circuit through lamp 126 and to complete a circuit from switch 204 to conductor 247 through the winding of relay 248 to ground. It will be seen that opening switch 229 interrupts the previously described circuit through holding relay 236, thereby causing valve 89 to close.

In order to open valve 89, it is necessary to energize holding relay 236. This may be accomplished by completing a circuit from the battery through conductors 122 and 222, jumper connections 223 and 224, across switch piece 219, through conductor 249, switch 104 and conductors 231, 232, 233 and 234 through the winding of relay 236 to ground. It will be seen that this requires that valve 79 be set in its upper position in which it closes connection 78 to tank 76, and also that valve 84 be closed, as otherwise the circuit would be open at switches 219 and 104 as shown. The valve 84 would normally be closed during the filling of tanks 10 to 15 inclusive thus also switch 104 would be closed. If, however, the valve 84 should be inadvertently left open, and the tank 76 becomes full the switch 204 would energize the relay 248 to close switch 258, to energize the solenoid 112 and trip the valve 84 towards closed position simultaneously with the opening of switch 229. Thus, it will be evident that switch 104 will be closed in any event and all that is required to again open valve 89 is to shift the valve 79 to the upper position to direct the flow of liquid to tank 74.

The circuit for supplying electrical energy to solenoid 91 of valve 89 comprises conductor 152 from main switch 117 to conductor 251 and from the latter through conductor 252, the winding of solenoid 91, conductors 253 and 254, switch 237 and thence through conductor 151 back to main switch 117. A suitable audible signalling means, such as a bell 256, may be connected in this circuit in parallel with the winding of solenoid 91 by means of conductors 252' and 253' so that an audible signal will be given while valve 89 is closed.

The circuit for solenoid 112 of valve 84 may comprise conductor 151 from main switch 117, through the winding of solenoid 112, conductor 257, normally open switch 258 and conductors 259 and 152 back to the main switch. This circuit is completed when relay 193 is unbalanced and completes a circuit through relay 248 which pulls in or closes switch 258.

The pressure responsive devices 132 may be and preferably are in the forms illustrated in Fig. 3 or in Fig. 4. In Fig. 3 the pressure responsive device is shown as comprising a unitary casing 261 having a substantially cylindrical lower portion and a frusto-conical upper portion forming a chamber 262 in which relatively fixed and movable contacts 263 and 264, respectively, may be disposed. The lower wall of chamber 262 may be formed of a flexible diaphragm 266 which is yieldable in response to a pressure difference on opposite sides thereof. The movable contact (264) may be mounted on a suitable bracket 267 secured to the diaphragm, preferably in the central portion thereof. The fixed contact (263) may be mounted on a suitable bracket 268 mounted on a piece of insulating material 269 carried by the casing, as by being secured to an internal flange 271 thereof by attaching screws 272. A suitable resistor 273 may be mounted on the upper side of the piece of insulating material 269 and electrically connected to bracket 268, as by means of a bolt 274 and a nut 276. As heretofore described this resistor serves to limit the current in the circuit including one portion of the winding of a differential relay so as to assure proper functioning thereof for guarding against an undetected short or break in the conductors connecting the pressure response switch to the differential relay. A suitable conductor, as conductor 143, may be connected to the upper end of resistor 273, as by means of a bolt 277 and a nut 278.

The casing 261 may be secured at its upper end to a conduit 279 mounted in the head or top 281 of a tank and in fluid tight relation therewith. If desired, a suitable fitting, such as elbow 282 may be mounted on the outside of the tank so as to form a continuation of the fluid tight passage of conduit 279 through which conductor 143 may pass.

In using this device, conduit 279 should extend below the top of the tank for a sufficient distance so that when the tank is filled to the desired level the pressure head on diaphragm 266 due to liquid, such as oil in the tank, will deflect this diaphragm sufficiently to move contact screw 264 out of engagement with contact 263 and thus interrupt the circuit through conductor 143, which at other times is grounded on diaphragm 266 and hence, on the tank.

The device shown in Fig. 4 differs principally from the one shown in Fig. 3 in that in the former the separable contacts of the pressure responsive device are located outside the tank. The device shown in Fig. 4 comprises a cylindrial casing 283 having a diaphragm 284 forming the lower wall thereof. A conduit 279' is connected to this casing and to a depending flange 286 in fluid tight relation. This depending flange 286 is carried by a detachable cover or closure member 287 secured over an opening 288 through which the pressure responsive device may be inserted in the tank. A suitable casing 289 may be detachably secured to cover 287 by means of studs 291 and nuts 292. This casing may have an opening in which a conduit 293 is fitted. A conductor, such as 143, may pass through this conduit into the casing and be secured to a suitable resistor 273 by means of a bolt 296 and a nut 297. This resistor and a fixed contact 298 may be disposed on a piece of insulating material 299 and secured to cover 287 within casing 289 by means of an attaching screw 301.

A vertically movable rod 302 may be mounted on diaphragm 284 and extend through conduit 279' and flange 286 into casing 289. For adjusting the action of the diaphragm a suitable coil spring 303 may be disposed about this rod and adapted to seat at is lower end on an internal flange 304. At its upper end this spring may engage a washer 306 positioned on the rod by adjusting and locking nuts 307 threaded thereon. A bracket 308 may be adjustably secured on rod 302 between clamping nuts 309 threaded thereon. A movable contact screw 311 may be adjustably mounted on bracket 308 for engagement with fixed contact 298.

The device shown in Fig. 4 operates in a manner very similar to the one shown in Fig. 3. The conduit 279' may be of such a length as will cause the diaphragm to be submerged in liquid, such as oil for example, to a depth which will provide the pressure head for deflecting the diaphragm upwardly to separate contacts 298 and 311 when the tank fills to the desired level. As the diaphragm is deflected upwardly rod 302 moves with it and by means of bracket 308 carries contact 311 upwardly out of engagement with contact 298 just as the liquid in the tank rises to the desired level. It will also be noted that separate contacts 298 and 311 are disposed outside the tank to be filled and that these contacts and all adjustable parts are accessible on removal of casing 289 from cover 287 without detaching the latter from the tank.

In using this system the hand wheels 32, 33 and 34 may be adjusted to open the valves controlling the flow to tanks 13, 14 and 15, and levers 53 may be latched in their raised positions to open the valves controlling the flow to tanks 10, 11 and 12. The main switch 117 may be closed and if none of the tanks 10—15 is full, all of the lamps 126 associated therewith should be illuminated and all the lamps 127 should be out. If one of the tanks happens to be full, the lamp 126 associated therewith will be out and the lamp 127 associated therewith will be on, thereby informing the attendant that the valve to this tank should be closed. Also if one of the tanks is full, relay 124 will be deenergized and alarm bells 186 and 187 will be ringing, indicating that valve 73 in the standpipe is open, and lamp 182 will be out. When main switch 117 is closed, the lighting up of lamps 126, which preferably are green in color, indicates that the circuits are in order and the lighting up of lamp 182, which is preferably red in color, indicates that valve 73 in the standpipe is closed so that the tanks may be filled rapidly under a relatively high degree of pressure.

Fluid such as fuel oil may be delivered under a relatively high degree of pressure from some source, as from barge or shore pumps to connections 18 and 19 which conduct the oil into feed main 17. The oil then passes through conduit 21 into manifolds 22 and 23 and through the tail pipes to the respective tanks.

As one of the tanks becomes full, its pressure responsive device 132 opens the circuit through conductor 143, thereby unbalancing the relay 131 associated with this tank and causing this relay to attract switches 128 and 129. This movement of switch 128 opens the circuit through green lamp 126 which goes out, and completes the circuit which lights lamp 127, which is preferably orange in color. Opening switch 129 interrupts the circuit through relay 124, which then allows switch 172 to move from contact 174 to contact 173, thereby deenergizing solenoids 168 so that spring 163 may open valve 73 and permit oil from conduit 21 to discharge through standpipe 72. This reduces the pressure on the oil supplied to a safe value as determined by the standpipe. Also, as switch 172 separates from contact 174, red light 182 goes out and as this switch engages contact 173 alarm bells 186 and 187 start ringing. The ringing of bell 186 may inform an attendant in the engine room, for example, that one of the tanks is full and its admission valve should be closed, while the ringing of bell 187 may inform an attendant on the barge of this situation.

If on observation of lamps 126 and 127, the filled tank is found to be one of tanks 13, 14 or 15, it may be isolated from the system by turning the appropriate one of hand wheels 32, 33 or 34 to close the admission valve to the filled tank. For purposes of illustration, tank 14 is shown as one which has just been filled and its admission valve is still open, while tank 13 is illustrated as a tank which has been previously filled and its admission valve has been closed by operating hand wheel 32. It will be seen that closing the admission valve opens the circuit through orange lamp 127 and that switch piece 43 completes a by-pass circuit through conductors 148 bridging open switch 129, thereby completing the circuit through relay 124 which pulls switch 172 into engagement with contact 174. This completes the circuit through red lamp 182 and solenoids 168 which close valve 73 and thus restore the high degree of pressure on the system. This movement of switch 172 also opens the circuit through bells 186 and 187 which then stop ringing.

If the tank just filled is one of tanks 10, 11 or 12, the circuits and associated devices operate as just described for tanks 13—15, but the admission valve for this filled tank is automatically closed. For instance, tank 11 may be considered as one which is filled nearly to the desired level. As the oil in this tank reaches the desired level and a circuit is completed through switch piece 59 and orange lamp 127, a branch circuit is also completed through relay 161 which closes switch 158, thereby causing solenoid 64 to trip latch 68 to allow spring 63 to close the admission valve to this tank. For example, tank 10 is illustrated as one which has been filled previously and it will be noted that as soon as its admission valve closed, switch 59 opened the circuit through orange lamp 127 and relay 161 and the latter then allowed switch 158 to open, thus deenergizing solenoid 64.

When valve 73 is open oil may pass through the standpipe and be discharged therefrom into one or the other of tanks 74 or 76 depending upon the position of three-way valve 79; and at times oil may pass from conduit 21 to tanks 74 and 76 through valves 83 and 84 when the latter are open as will be understood by those skilled in this art. In the last instance an example of use of the conduits 81, 82, would be to fill the settling tanks 74 and 76 to capacity after the main tanks 10 to 15 have been filled. During such filling of settling tanks 74 and 76 the oil would flow from conduit 17 through conduits 21, 81 and 82 into one or both the tanks 74 and 76. With valve 79 set as shown, connection 72 to tank 74 is closed and oil is being directed from the standpipe through connection 78 into tank 76. The lamps 194 and 126 associated with tank 76 are illuminated, the former indicating that valve 79 is directing oil to this tank and the latter indicating that this tank is filling but not full. Preferably these lamps have distinguishable colors, as lamp 194 may be white and lamp 126 may be green.

When tank 76 becomes full, its pressure responsive device 132 unbalances relay 193 which then attracts switches 204 and 229, the former of which opens the circuit through this lamp 126, which goes out, and completes the circuit through relay 248 which closes switch 258 and completes the circuit through solenoid 112, thereby tripping latch 109 and allowing spring 105 to close valve 84 if it is not already closed. The opening of switch 229 deenergizes relay 236 and allows switch 237 to close so that solenoid 91 trips latch 94 and spring 101 closes valve 89. Before valve 89 can be opened, valve 84 must be closed and connection 78 must be closed by shifting valve 79 to its other position. In the meantime overflow 88 provides an additional safety feature which assures that filled tank 76 can not be subjected to pressure above atmosphere. While this overflow is capable of passing oil overboard as required by government regulations, it will be evident that with the system described herein, there will never be any occasion for oil to pass overboard through this overflow.

It will also be seen that when valve 79 is set in its upper position and tank 74 fills to the desired level, the lamp 126 associated therewith will go out and relay 236 will be deenergized by opening switch 228 so that valve 89 will close. While valve 89 is closed alarm bell 256 rings to inform the attendant that oil is not being delivered through the feed main. Before valve 89 may now be opened, relay 236 must be energized and this requires that valve 83 be closed if it is not already closed and that valve 79 be shifted to the position shown. In the meantime overflow 87 is available for passing oil overboard to avoid excessive pressure on tank 74, even though the need for such an overflow is not present with this system as just pointed out with reference to tank 76 and overflow 88.

It will be seen that this invention provides for fueling a ship in the shortest possible time consistent with a reasonable size of pipes and the capacity of the barge or shore pumps available. It will also be seen that while the filling system is described and shown partially automatic and partially manual, other combinations of these automatic or manually operated features may be used. Also, this system can be entirely hand operated at any time by merely leaving main switch 117 open. This feature would become useful if the electrical system should fail, for then this fueling equipment could be operated as the familiar standpipe system with no disadvantages other than those inherent in the standpipe systems of the present time.

Any failure of the electrical circuits during operation will automatically cause standpipe valve 73 to open so that the filling of the tanks may continue under safe standpipe pressure. Should any break or short occur in conductor 143 leading to pressure responsive device 132, the differential relay 131 associated therewith will be thrown out of balance and the standpipe valve will automatically open and the fuel tanks will be protected from excessive pressure. When this happens the signal lights will operate as though a tank is full, and when this is found not to be the case, the electrical failure can be located. Merely closing the admission valve to such a tank will permit the remaining tanks to be filled under full pressure and the tank having the defective circuit may be filled last with standpipe pressure.

During normal operation when the tanks are filling all the circuits are energized and the effect of a tank becoming full is to deenergize some of the circuits, thus causing the standpipe valve to open. Because of this fact, it is quite simple at the start when main switch 117 is first closed to ascertain if all of the circuits are in order by observing indicator lights 126, 127 and 182. With main switch 117 closed and a manifold valve opened, the burning of a green lamp 126 indicates that this particular tank circuit is in order. If the orange light 127 burns instead of green light 126, there is indication that either the tank is full or there is a short or break in the conductors leading to the tank. If neither of these lights burn when a manifold valve is opened, this indicates that either a bulb is burned out or the switch operated by the manifold valve is out of order.

The burning of light 182 indicates that the circuits for valve 73 are in order and the valve is closed. If this light does not burn and the alarms do not ring, there is indication that either a bulb is burned out or there is a power failure in the solenoid valve circuits associated with valve 73. Such a failure will allow the standpipe valve to remain open so that filling of the tanks may continue under safe standpipe pressure. No failure in the overflow or settling tank circuits can cause damage for both of these tanks are protected by individual overflows.

The invention described herein, if patented, may be manufactured and used by or for the Government for governmental purposes without the payment to us of any royalty thereon.

It should be understood that the present disclosure is for the purposes of illustration only, and that the invention includes all modifications and equivalents which fall within the scope of the appended claims.

We claim as our invention and desire to secure by our patent:

1. Means for conducting liquid under pressure to a plurality of tanks, valves for controlling the flow of liquid to said tanks, means responsive to the filling of one tank to a desired level for relieving the pressure on the liquid being supplied while the valve controlling the flow of liquid to said one tank remains open, and means responsive to closure of said valve to said one tank for restoring the pressure on the liquid being supplied to the remaining tanks.

2. In a system of the class described for filling a plurality of tanks, the combination with a plurality of tanks, of valved connections to each of said tanks, means for supplying liquid under at least two degrees of pressure to said valved connections, the latter means normally supplying liquid at the higher of said two degrees of pressure, means associated with each of said tanks and responsive to filling thereof substantially to the desired level for controlling said supply means to cause it to supply liquid at the lesser of said two degrees of pressure, and means responsive to isolation of a filled tank from the system for causing said supplying means to resume the supply of liquid to the remaining unfilled tanks at the higher of said two degrees of pressure.

3. In a system of the class described for filling a plurality of tanks, the combination with a plurality of tanks, of a manifold, valved connections from said manifold to each of said tanks, means for supplying liquid under at least two degrees of pressure to said manifold, the latter means normally supplying liquid at the higher of said two degrees of pressure when none of the tanks communicating with said manifold is filled substantially to the desired level, means associated with each of said tanks and responsive to the filling thereof substantially to the desired level for controlling said supply means for causing it to supply liquid at the lesser of said two degrees of pressure, and means responsive to isolation of a filled tank from said manifold for causing said supplying means to restore the supply of liquid to said manifold at the higher of said two degrees of pressure.

4. In a system of the class described for filling a plurality of tanks, the combination with a plurality of tanks, of valved connections to each of said tanks, means for supplying liquid under at least two degrees of pressure to said valved connections; the latter means normally supplying liquid at the higher of said two degrees of pressure, means for indicating at which of said degrees of pressure liquid is being supplied, means associated with each of said tanks and responsive to filling thereof substantially to the desired level for controlling said supply means to cause it to supply liquid at the lesser of said two degrees of pressure, and means responsive to isolation of a filled tank from the system for causing said supplying means to resume the supply of liquid to the remaining unfilled tanks at the higher of said two degrees of pressure.

5. In a system of the class described for filling a plurality of tanks, the combination with a plurality of tanks, of valved connections to each of said tanks, means for supplying liquid under at least two degrees of pressure to said valved connections the latter means normally supplying liquid at the higher of said two degrees of pressure, audible signal means operable in response to filling substantially to the desired level of any of said tanks, means associated with each of said tanks and responsive to filling thereof substantially to the desired level for controlling said supply means to cause it to supply liquid at the lesser of said two degrees of pressure, and means responsive to isolation of a filled tank from the system for causing said supplying means to resume the supply of liquid to the remaining unfilled tanks at the higher of said two degrees of pressure.

6. In a system of the class described for filling a plurality of tanks, the combination with a plurality of tanks, of valved connections to each of said tanks, means for supplying liquid under at least two degrees of pressure to said valved connections, the latter means normally supplying liquid at the higher of said two degrees of pressure, visual signalling means associated with the respective tanks for indicating which tanks are filling, means associated with each of said tanks and responsive to filling thereof substantially to the desired level for controlling said supply means to cause it to supply liquid at the lesser of said two degrees of pressure, and means responsive to isolation of a filled tank from the system for causing said supplying means to resume the supply of liquid to the remaining unfilled tanks at the higher of said two degrees of pressure.

7. In a system of the class described for filling a plurality of tanks, the combination with a plurality of tanks, of valved connections to each of said tanks, means for supplying liquid under at least two degrees of pressure to said valved connections, the latter means normally supplying liquid at the higher of said two degrees of pressure, means associated with each of said tanks and responsive to filling thereof substantially to the desired level for controlling said supply means to cause it to supply liquid at the lesser of said two degrees of pressure, visual signalling means associated with the respective tanks for indicating which tanks are filled substantially to the desired level and are still in communication with said supply means, and means responsibe to isolation of a filled tank from the system for causing said supplying means to resume the supply of liquid to the remaining unfilled tanks at the higher of said two degrees of pressure.

8. In a system of the class described for filling a plurality of tanks, the combination with a plurality of tanks, of valved connections to each of said tanks, means for supplying liquid under at least two degrees of pressure to said valved connections, the latter means normally supplying liquid at the higher of said two degrees of pressure, means associated with each of said tanks and responsive to filling thereof substantially to the desired level for controlling said supply means to cause it to supply liquid at the lesser of said two degrees of pressure, alternately operable visual signalling means associated with the respective tanks for indicating respectively which tanks are filling and which tanks are filled substantially to the desired level and still in communication with said supply means, differential relays for controlling said signalling means, and means responsive to filling of a tank substantially to the desired level for operating the relay controlling the signalling means associated therewith.

9. In a system of the class described for filling a plurality of tanks, the combination with a plurality of tanks, of valved connections to each of said tanks, means for supplying liquid under at least two degrees of pressure to said valved connections, the latter means normally supplying liquid at the higher of said two degrees of pressure, means associated with each of said tanks and responsive to filling thereof substantially to the desired level for controlling said supply means to cause it to supply liquid at the lesser of said two degrees of pressure, alternately operable visual signalling means associated with the respective tanks for indicating respectively which tanks are filling and which tanks are filled substantially to the desired level and still in communication with said supply means, differential relays for controlling said signalling means, means responsive to filling of a tank substantially to the desired level for operating the relay controlling the signalling means associated therewith, and means responsive to isolation of the latter tank from said supply means for rendering inoperative said means for operating the latter relay.

10. In a system of the class described for filling a plurality of tanks, the combination with a plurality of tanks, of valved connections to each of said tanks, means for supplying liquid under at least two degrees of pressure to said valved connections, the latter means normally supplying liquid at the higher of said two degrees of pressure, means associated with each of said tanks and responsive to filling thereof substantially to the desired level for controlling said supply means to cause it to supply liquid at the lesser of said two degrees of pressure, alternately operable visual signalling means associated with the respective tanks for indicating respectively which tanks are filling and which tanks are filled substantially to the desired level and are still in communication with said supply means, circuits for supplying electrical energy for operating said signalling means, differential relays for controlling said circuits, means responsive to filling of a tank substantially to the desired level for operating the relay controlling the circuits for the signalling means associated therewith, and means responsive to isolation of the latter tank from said supply means for rendering inoperative said means for operating the latter relay.

11. In a system of the class described for filling a plurality of tanks, the combination with a plurality of tanks, of valved connections to each of said tanks, means for supplying liquid under relatively high pressure to said valved connections, a standpipe for discharging liquid delivered by the supply means for reducing the pressure of liquid supplied to said valved connections, means associated with each of said tanks and responsive to the filling thereof substantially to the desired level for maintaining said standpipe open for discharging liquid from said supply means, and means responsive to isolation of a filled tank from the system for substantially closing said standpipe and thereby substantially restoring said relatively high pressure to liquid supplied to said valved connections.

12. In a system of the class described for filling a plurality of tanks, the combination with a plurality of tanks, of valved connections to each of said tanks, means for supplying liquid under relatively high pressure to said valved connections, a standpipe for discharging liquid delivered by the supply means for reducing the pressure of fluid supplied to said valved connections, means associated with each of said tanks and responsive to the filling thereof substantially to the desired level for maintaining said standpipe open for discharging liquid from said supply means, and electromagnetic means responsive to isolation of a filled tank from the system for substantially closing said standpipe and thereby substantially restoring said relatively high pressure to liquid supplied to said valved connections.

13. In a system of the class described for filling a plurality of tanks, the combination with a plurality of tanks, of valved connections to each of said tanks, means for supplying liquid under relatively high pressure to said valved connections, a standpipe for discharging liquid delivered by the supply means for reducing the pressure of liquid supplied to said valved connections, a normally open valve for controlling the flow through said standpipe, electromagnetic means for closing said valve, means associated with each of said tanks and responsive to the filling thereof substantially to the desired level for maintaining said electro-magnetic means deenergized so as to permit the latter valve to remain open, and means responsive to isolation of a filled tank from the system for energizing said electromagnetic means and thereby closing said standpipe and restoring said relatively high pressure to liquid supplied to said valved connections.

14. In a system of the class described for filling a plurality of tanks, the combination with a plurality of tanks, of a manifold, valved connections from said manifold to each of said tanks, means for supplying liquid under at least two degrees of pressure to said manifold, the latter means normally supplying liquid at the higher of said degrees of pressure when none of the tanks communicating with said manifold is filled substantially to the desired level, means associated with each of said tanks and responsive to the filling thereof substantially to the desired level for controling said supply means for causing it to suppy liquid at the lesser of said two degrees of pressure, means responsive to the filling of one or more of said tanks substantially to the desired level thereof for isolating the latter tank from said manifold, and means responsive to isolation of a filled tank from said manifold for causing said supplying means to restore the supply of liquid to said manifold at the higher of said two degrees of pressure.

15. In a system of the class described for filling a plurality of tanks, the combination with a plurality of tanks, of valved connections to each of said tanks, means for supplying liquid under at least two degrees of pressure to said valved connections, the latter means normally supplying liquid at the higher of said two degrees of pressure, means associated with each of said tanks and responsive to filling thereof substantially to the desired level for controlling said supply means to cause it to supply liquid at the lesser of said two degrees of pressure, means responsive to the filling of one or more of said tanks substantially to the desired level thereof for isolating the latter tank from said supply means, and means responsive to isolation of a filled tank from the system for causing said supplying means to resume the supply of liquid to the remaining unfilled tanks at the higher of said two degrees of pressure.

16. In a system of the class described for filling a plurality of tanks, the combination with a plurality of tanks, of valved connections to each of said tanks, means for supplying liquid under at least two degrees of pressure to said valved connections, the latter means normally supplying liquid at the higher of said two degrees of pressure, means associated with each of said tanks and responsive to filling thereof substantially to the desired level for controlling said supply means to cause it to supply liquid at the lesser of said two degrees of pressure, means associated with one or more of said tanks and tending to isolate them from the supply means, electromagnetic means for causing the latter means to isolate each of said one or more tanks from the supply means, means responsive to the filling of said one or more tanks substantially to the desired level thereof for energizing the electromagnetic means associated therewith and thereby causing such tank or tanks to be isolated from the supply means, and means responsive to isolation of a filled tank from the system for causing said supplying means to resume the supply of liquid to the remaining unfilled tanks at the higher of said two degrees of pressure.

17. In a system of the class described for filling a plurality of tanks, the combination with a plurality of tanks to be filled, of valved connections to each of said tanks, means for supplying liquid to said valved connections, a standpipe connected to said supply means for limiting the pressure of the liquid so supplied, a plurality of overflow tanks for receiving liquid issuing from said standpipe, selective means for directing liquid issuing from said standpipe to each of said overflow tanks, valve means for controlling the delivery of liquid from the supply means, means responsive to filling of one of said overflow tanks substantially to the desired level thereof for closing said valve means, means for maintaining said valve means closed while said one overflow tank has communication with the system, and means responsive to operation of said selective means for directing liquid to another of said overflow tanks for releasing said valve means so that it may be opened.

18. In a system of the class described for filling a plurality of tanks, the combination with a plurality of tanks to be filled, of valved connections to each of said tanks, means for supplying liquid to said valved connections, a standpipe connected to said supply means for limiting the pressure of the liquid so supplied, a plurality of overflow tanks for receiving liquid issuing from said standpipe, selective means for directing liquid issuing from said standpipe to each of said overflow tanks, visual signalling means associated with the respective overflow tanks for indicating which of these tanks is not filled to the desired level, valve means for controlling the delivery of liquid from the supply means, means responsive to filling of one of said overflow tanks substantially to the desired level thereof for closing said valve means, means for maintaining said valve means closed while said one overflow tank has communication with the system, and means responsive to operation of said selective means for directing liquid to another of said overflow tanks for releasing said valve means so that it may be opened.

19. In a system of the class described for filling a plurality of tanks, the combination with a plurality of tanks to be filled, of valved connections to each of said tanks, means for supplying liquid to said valved connections, a standpipe connected to said supply means for limiting the pressure of the liquid so supplied, a plurality of overflow tanks for receiving liquid issuing from said standpipe, selective means for directing liquid issuing from said standpipe to each of said overflow tanks, valve means for controlling the delivery of liquid from the supply means, means responsive to filling of one of said overflow tanks substantially to the desired level thereof for closing said valve means, means for maintaining said valve means closed while said one overflow tank has communication with the system, audible signalling means operable while said valve means is closed and in response to closing thereof, and means responsive to operation of said selective means for directing liquid to another of said overflow tanks for releasing said valve means so that it may be opened.

20. In a system of the class described for filling a plurality of tanks, the combination with a plurality of tanks to be filled, of valved connections to each of said tanks, means for supplying liquid to said valved connections, a standpipe connected to said supply means for limiting the pressure of the liquid so supplied, a plurality of overflow tanks for receiving liquid issuing from said standpipe, selective means for directing liquid issuing from said standpipe to each of said overflow tanks, valve means for controlling the delivery of liquid from the supply means, means responsive to filling of one of said overflow tanks substantially to the desired level thereof for closing said valve means, means for maintaining said valve means closed while said one overflow tank has communication with the system, visual signalling means for indicating the overflow tank to which liquid is being directed from said standpipe, and means responsive to operation of said selective means for directing liquid to another of said overflow tanks for releasing said valve means so that it may be opened.

21. In a system of the class described for filling a plurality of tanks, the combination with a plurality of tanks to be filled, of valved connections to each of said tanks, means for supplying liquid to said valved connections, a standpipe connected to said supply means for limiting the pressure of the liquid so supplied, a plurality of overflow tanks for receiving liquid issuing from said standpipe, selectively operable means for directing liquid issuing from said standpipe to each of said overflow tanks, valved connections from said supply means to the respective overflow tanks, valve means for controlling the delivery of liquid from the supply means, means responsive to filling of one of said overflow tanks substantially to the desired level thereof for closing said valve means, means for maintaining said valve means closed while said one tank remains in communication with said supply means, and means responsive to isolation of said one tank from said supply means for releasing said valve means so that the latter may be opened to restore the delivery of liquid to the system.

22. In a system of the class described for filling a plurality of tanks, the combination with a plurality of tanks to be filled, of valved connections to each of said tanks, means for supplying liquid to said valved connections, a standpipe connected to said supply means for limiting the pressure of the liquid so supplied, a plurality of overflow tanks for receiving liquid issuing from said standpipe, selectively operable means for directing liquid issuing from said standpipe to each of said overflow tanks, valved connections from said supply means to the respective overflow tanks, valve means for controlling the delivery of liquid from the supply means, means responsive to filling of one of said overflow tanks substantially to the desired level thereof for closing said valve means, means for maintaining said valve means closed while said one tank remains in communication with said supply means, means responsive to filling of said one of said overflow tanks substantially to the desired level thereof for closing the valved connection associated therewith, and means responsive to isolation of said one tank from said supply means for releasing said valve means so that the latter may be opened to restore the delivery of liquid to the system.

23. Means for controlling the simultaneous filling of a plurality of ship's tanks comprising, a plurality of tanks to be filled with a liquid, means for conveying said liquid to each tank under relatively high pressure, valves in said conveying means for directing the flow of liquid to each of said tanks and means responsive to the filling of any one of said tanks to the desired liquid level for decreasing the pressure of the liquid being supplied to said tanks.

24. In a system of the class described comprising in combination, a plurality of tanks to be filled with a liquid, means for conducting and directing a liquid to said tanks under relatively high pressure, means for isolating said tanks from said liquid conducting means when the liquid level therein reaches a predetermined height comprising, a spring closed valve associated with each tank, solenoid means for tripping said valve to closed position, a relay controlling said solenoid means, liquid level responsive means associated with each tank, switch means operated by said liquid level responsive means to open position, a differential relay means having a winding connected between its ends to a source of electric energy, a conductor connecting one end of said winding directly to ground, a resistor connected at one end to said switch means, a conductor connecting said resistor to said other end of the winding of said differential relay, said resistor having sufficient resistance to maintain the differential relay in a balanced condition, means operated by said differential relay when it becomes unbalanced for energizing said first mentioned relay, whereby said spring closed valve will be tripped when the liquid level in said tank reaches a predetermined height and when a short occurs between said resistor and said differential relay to thus isolate said tank from the liquid conducting means.

25. In a system of the class described comprising in combination, a plurality of tanks to be filled with a liquid, means for conducting and directing said liquid to said tanks under relatively high pressure, means for relieving said pressure in said conducting means and means for controlling said relieving means comprising, means responsive to the attainment of a predetermined, liquid level in each tank, switch means operated thereby having one contact grounded, differential relay means having a winding connected between its ends to a source of electric energy, an electrical connection between one end of said winding and ground, a resistor connected to the other contact of said switch means, an electrical connection between said resistor and the other end of said winding, said resistor having sufficient resistance to limit the flow of electric energy therethrough to balance said differential relay means when said contacts are closed, switch means operable in response to the unbalanced condition of said differential relay means, a relay controlled by said last mentioned switch means, means controlled by said relay for operating said means for relieving pressure in said conducting means whereby said pressure will be relieved when any one tank becomes full and when a short circuit occurs between said resistor and said differential relay.

CLAUDIUS R. McCAULEY.
OTIS W. PAGE.